(12) United States Patent
Murota et al.

(10) Patent No.: US 10,584,983 B2
(45) Date of Patent: Mar. 10, 2020

(54) COVER STRUCTURE OF TACTILE SENSOR AND TACTILE SENSOR

(71) Applicants: NOK Corporation, Tokyo (JP); Nippon Mektron, Ltd., Tokyo (JP)

(72) Inventors: Yuki Murota, Kanagawa (JP); Hiroshi Umebayashi, Kanagawa (JP); Toru Uda, Kanagawa (JP); Hidekazu Yoshihara, Ibaraki (JP); Taisuke Kimura, Ibaraki (JP); Keizo Toyama, Ibaraki (JP)

(73) Assignees: NOK CORPORATION, Tokyo (JP); NIPPON MEKTRON, LTD., Tokyo (JP)

( * ) Notice: Subject to any disclaimer, the term of this patent is extended or adjusted under 35 U.S.C. 154(b) by 0 days.

(21) Appl. No.: 15/518,749

(22) PCT Filed: Jan. 29, 2016

(86) PCT No.: PCT/JP2016/052780
§ 371 (c)(1),
(2) Date: Apr. 12, 2017

(87) PCT Pub. No.: WO2016/132868
PCT Pub. Date: Aug. 25, 2016

(65) Prior Publication Data
US 2017/0343394 A1   Nov. 30, 2017

(30) Foreign Application Priority Data
Feb. 17, 2015   (JP) .................................. 2015-028922

(51) Int. Cl.
*G01D 11/24*   (2006.01)
*G01L 1/26*   (2006.01)
(Continued)

(52) U.S. Cl.
CPC ............ *G01D 11/245* (2013.01); *B25J 13/084* (2013.01); *B25J 15/0033* (2013.01); *G01L 1/26* (2013.01)

(58) Field of Classification Search
CPC ......... G01D 11/245; G01L 1/26; G01L 1/205; G01L 5/228; G01L 1/146; G01L 1/20;
(Continued)

(56) References Cited

U.S. PATENT DOCUMENTS

2008/0087097 A1   4/2008   Nagata et al.
2009/0235762 A1   9/2009   Schaffner et al.
(Continued)

FOREIGN PATENT DOCUMENTS

CN   101107504 A   1/2008
CN   101473204 A   7/2009
(Continued)

OTHER PUBLICATIONS

First Office Action in the corresponding Chinese Application No. 201680003492.7 dated Dec. 3, 2018 with English Translation.
(Continued)

*Primary Examiner* — Randy W Gibson
*Assistant Examiner* — Gedeon M Kidanu
(74) *Attorney, Agent, or Firm* — Pearne & Gordon LLP

(57) ABSTRACT

The present invention aims at providing a cover structure of a tactile sensor and a tactile sensor that can secure sufficient adhesion between a sensor body and a covering layer without providing an adhesive layer and have no possibility of causing a sensor to make detection error due to the covering layer formed thereon. A cover structure of a tactile sensor according to the present invention includes a sensor body 2 and a covering layer 3 made of elastic body molded on the sensor body 2. The covering layer 3 includes at least two layers of an outer layer 32 disposed as the outermost
(Continued)

layer and an inner layer 31 disposed to come in contact with the sensor body 2 and having a higher adhesiveness and a lower hardness than those of the outer layer 32, and is integrally molded with the sensor body 2 by the cast molding. It is preferable that the sensor body 2 be disposed on the top surface of the base 4, the covering layer 3 cover over the sensor body 2 and the base 4, and the inner layer 31 do not cover the bottom surface of the base 4.

4 Claims, 2 Drawing Sheets

(51) Int. Cl.
  *B25J 13/08* (2006.01)
  *B25J 15/00* (2006.01)
(58) Field of Classification Search
  CPC .... G01L 1/2206; G01L 1/2287; B25J 13/084; B25J 15/0033; B25J 15/008; H01L 2924/00; H01L 2924/14; H01L 2924/1461; H01L 2224/32221; H01L 24/32
  See application file for complete search history.

(56) References Cited

U.S. PATENT DOCUMENTS

| | | | | |
|---|---|---|---|---|
| 2011/0083517 A1* | 4/2011 | Muroyama | ............ | B25J 13/084 73/862.046 |
| 2013/0056248 A1* | 3/2013 | Kajiya | ................... | H05K 1/028 174/254 |
| 2014/0102771 A1* | 4/2014 | Kajiya | ................... | H05K 1/028 174/254 |
| 2014/0124257 A1* | 5/2014 | Yoshihara | ............... | H05K 1/023 174/350 |
| 2014/0150571 A1* | 6/2014 | Kuniyoshi | ............... | G01L 1/205 73/862.625 |
| 2014/0174239 A1 | 6/2014 | Nagata et al. | | |
| 2014/0260678 A1* | 9/2014 | Jentoft | ...................... | G01L 5/16 73/862.046 |
| 2016/0279805 A1* | 9/2016 | Murota | ................... | B25J 15/008 |
| 2016/0327441 A1* | 11/2016 | Iwase | ................... | A61B 5/1036 |

FOREIGN PATENT DOCUMENTS

| | | |
|---|---|---|
| CN | 102735378 B | 10/2012 |
| CN | 103765181 A | 4/2014 |
| CN | 104266780 A | 1/2015 |
| JP | 04-054422 A | 2/1992 |
| JP | 2004-358634 A | 12/2004 |
| JP | 2006-084354 A | 3/2006 |
| JP | 3124933 U | 8/2006 |
| JP | 2011-085435 A | 4/2011 |
| JP | 2012-047299 A | 3/2012 |
| JP | 2012-088084 A | 5/2012 |
| JP | 2013096716 | 5/2013 |

OTHER PUBLICATIONS

Office Action in the corresponding Taiwanese Application No. 105104482 dated Dec. 12, 2018 with English Translation.
International Search Report for corresponding International Application No. PCT/JP2016/052780 dated Mar. 8, 2016 and English translation.
Written Opinion for corresponding International Application No. PCT/JP2016/052780 dated Mar. 8, 2016 and English translation.
Notification of Reasons for Refusal dated Sep. 17, 2018 for corresponding Korean Application No. 10-2017-7012718 and English translation.
Reasons for Refusal dated Jul. 1, 2019 for corresponding Japanese Application No. 2016-543096.
Korean Office Action for Application No. 10-2017-7012718, dated Apr. 29, 2019.
Taiwanese Decision to Grant for Application No. 105104482, dated Apr. 24, 2019.
Second Chinese Office Action dated Jul. 15, 2019 for corresponding Chinese Application No. 201680003492.7 and English translation.
Japanese Office Action dated Sep. 17, 2019 for corresponding Japanese Application No. 2016-543096 and English translation.
Decision to Grant a patent dated Oct. 29, 2019 for corresponding Korean Application No. 10-2017-7012718 and English translation.
Decision of Refusal dated Dec. 3, 2019 for corresponding Japanese Application No. 2016-543096 and English translation.
Decision of Dismissal of Amendment dated Dec. 3, 2019 for corresponding Japanese Application No. 2016-543096 and English translation.

* cited by examiner

COVER STRUCTURE OF TACTILE SENSOR AND TACTILE SENSOR

FIELD OF THE INVENTIONS

The present invention relates to a cover structure of a tactile sensor and a tactile sensor, more specifically, a cover structure of a tactile sensor and a tactile sensor that can secure sufficient adhesion between a sensor body and a covering layer without providing an adhesive layer and have no possibility of causing a sensor to make detection error due to the covering layer formed thereon.

BACKGROUND OF THE INVENTIONS

In recent years, sensors to detect a pressure by a human body have been developed enthusiastically. These sensors are required to directly measure respective parts of the human body, such as a hand, a leg, and a body. Thus, a sensor device a surface of which is covered with a soft covering layer is demanded.

Pressure sensitive rubber sensors and capacitance sensors have conventionally been known as sensors to detect the pressure of a human body. In either sensor, a sensor body and a covering layer are formed separately and bonded to each other using an adhesive (Patent Document 1).

PRIOR ART DOCUMENT

Patent Document

Patent Document 1: JP-A-2013-96716

SUMMARY

Similar to a conventional sensor, if a sensor body and a covering layer are bonded to each other with an adhesive, an inner stress produced when the adhesive is cured applies a load to the sensor body. This is one of the factors causing detection error on such a sensor. Thus, a method of bonding the sensor body and the covering layer with an adhesive tape has been considered. However, the method is difficult to be applied to a sensor body having bumps and dents.

The present invention aims at providing a cover structure of a tactile sensor and a tactile sensor that can secure sufficient adhesion between a sensor body and a covering layer without providing an adhesive layer and have no possibility of causing a sensor to make detection error due to the covering layer formed thereon.

Other problems of the present invention will be apparent from the following description.

Means for Solving Problem

The above-described problems are solved by the following respective inventions.

1. A cover structure of a tactile sensor comprising: a sensor body; and
a covering layer made of elastic body molded on the sensor body, wherein the covering layer includes at least two layers of an outer layer disposed as the outermost layer and an inner layer disposed to come in contact with the sensor body and having a higher adhesiveness and a lower hardness than those of the outer layer, and is integrally molded with the sensor body by a cast molding.

2. The cover structure of a tactile sensor according to 1, wherein the sensor body is disposed on a top surface of the base, the covering layer covers over the sensor body and the base, and the inner layer does not cover a bottom surface of the base.

3. The cover structure of a tactile sensor according to 1 or 2, wherein the inner layer has a Shore A hardness of 0 to 40 degrees, and the outer layer has a Shore A hardness of 20 to 90 degrees.

4. The cover structure of a tactile sensor according to 1, 2, or 3, wherein the inner layer has a thickness of 1.0 mm to 20.0 mm, and the outer layer has a thickness of 0.2 mm to 2.0 mm.

5. A tactile sensor comprising the cover structure of a tactile sensor according to any one of 1 to 4.

Effect of the Invention

With the present invention, a cover structure of a tactile sensor and a tactile sensor can be provided that can secure sufficient adhesion between a sensor body and a covering layer without providing an adhesive layer and have no possibility of causing a sensor to make detection error due to the covering layer formed thereon.

DETAILED DESCRIPTION OF THE INVENTIONS

Embodiments to carry out the present invention will be explained hereinafter with reference to drawings.

Figure 1:
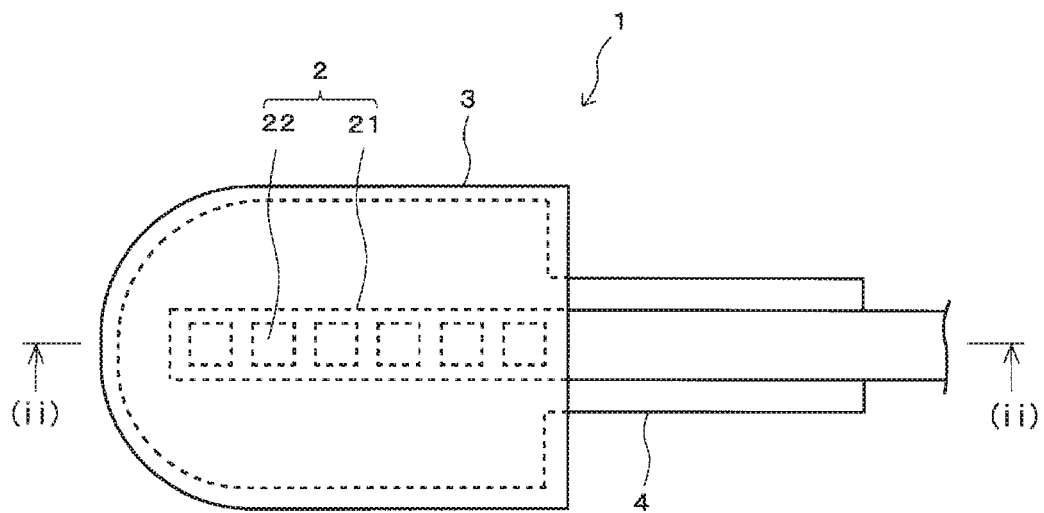
FIG. 1 is a plan view of a tactile sensor illustrating a cover structure of a tactile sensor according to a first embodiment of the present invention.
Figure 2:
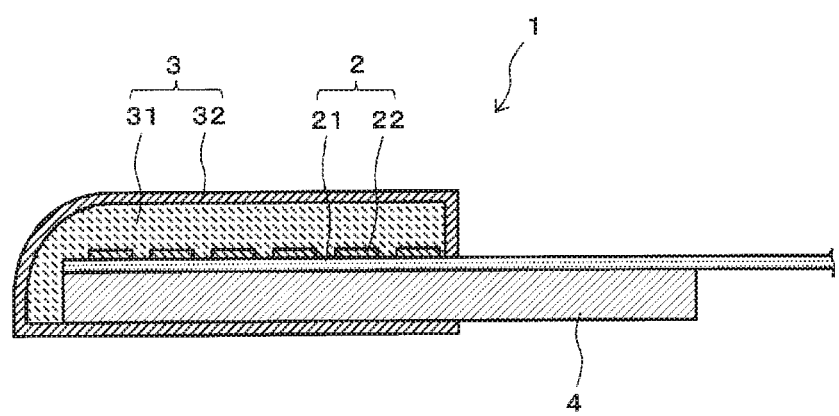
FIG. 2 is a sectional view taken along (ii)-(ii) line in FIG. 1.

FIG. 1 is a plan view of a tactile sensor illustrating a cover structure of a tactile sensor according to a first embodiment of the present invention and FIG. 2 is a sectional view taken along (ii)-(ii) line in FIG. 1.

A tactile sensor 1 includes a sensor body 2, a covering layer 3, and a base 4. The sensor body 2 is mounted on the base 4. The covering layer 3 made of elastic body is integrally molded to cover the base 4 and the sensor body 2 together.

The sensor body 2 includes a flexible print circuit-board (FPC) 21 and a plurality of sensor elements 22. The sensor elements 22, such as pressure sensors and capacitance sensors, are disposed in line on the FPC 21 in the longitudinal direction of the tactile sensor 1. The FPC 21 is mounted on the top surface of the base 4 made of resin or metal so as to direct the sensor elements 22 upward.

The covering layer 3 has a two-layered structure including an inner layer 31 and an outer layer 32 disposed to cover the outside of the inner layer 31. The inner layer 31 is disposed to come in contact with the sensor body 2.

Specifically, the inner layer 31 is formed on a wide tip end of the base 4 to cover the top surfaces of the base 4 and the sensor body 2 and the lateral surfaces of the base 4. Note that, the inner layer 31 is formed to be flush with the bottom surface of the base 4. Accordingly, the bottom surface of the base 4 (the opposite surface to the surface on which the sensor body 2 is mounted) is not covered with the inner layer 31.

The outer layer 32 forms the outermost layer of the covering layer 3 and covers the outer surface of the inner layer 31. The outer layer 32 goes around to the bottom surface of the base 4 to cover the bottom surface of the base 4. The outer layer 32 has a function to protect the sensor body 2 including the FPC 21 and the sensor elements 22. In the present invention, the covering layer 3 goes around to the bottom surface of the base 4 to be formed integrally. Thus, there is no possibility of separating the covering layer 3 from the base 4.

Both the inner layer 31 and the outer layer 32 are made of flexible elastic body. The elastic body forming the inner layer 31 has higher adhesiveness and lower hardness than those of the elastic body forming the outer layer 32. It is preferable that the elastic body forming the outer layer 32 have higher crosslinking density, lower adhesiveness, and higher hardness than those of the elastic body forming the inner layer 31.

In the covering layer 3, both the inner layer 31 and the outer layer 32 are integrally molded over the sensor body 2 and the base 4 by the cast molding.

The cast molding molds the covering layer 3 in the following steps: setting the base 4 integrated with the sensor body 2 mounted thereon in a casting mold; injecting the raw material of the covering layer 3 in the casting mold; and curing the raw material.

More specifically, first, an integrated combination of the base 4 and the sensor body 2 disposed on the base 4 is set in a casting mold for the inner layer 31, the raw material of the inner layer 31 is injected in the casting mold, and the raw material is cured. In this process, the bottom surface of the base 4 abuts on an inner surface of the casting mold to prevent the raw material of the inner layer 31 from going around to the bottom surface of the base 4.

Next, the integrated article on which the inner layer 31 is integrally molded is picked up from the casting mold and is set in a casting mold for the outer layer 32. In this process, the bottom surface of the base 4 is separated from an inner surface of the casting mold by the thickness of the outer layer 32 so that the raw material of the inner layer 32 goes around to the bottom surface of the base 4. Then, similar to the process mentioned above, the raw material of the outer layer 32 is injected in the casting mold, and the raw material is cured, whereby the outer layer 32 is integrally formed on the outer surface of the inner layer 31.

As a result, the sensor body 2, the base 4, and the covering layer 3 come in close contact with each other and integrated by the adhesiveness of the inner layer 31 higher than that of the outer layer 32. Also the inner layer 31 and the outer layer 32 come in close contact with each other and integrated by the adhesiveness of the inner layer 31. Thus, sufficient bonding property between the sensor body 2, the base 4, and the covering layer 3 is secured without using an adhesive to integrate them together. No adhesive is used, and thus, there is no possibility of making detection error due to the inner stress produced when the adhesive is cured.

The covering layer 3 is integrally molded so that the inner layer 31 having the hardness lower than that of the outer layer 32 comes in contact with the sensor body 2 by the cast molding. Thus, the covering layer 3 can be along bumps and dents on the surface of the sensor body 2 without a gap, thereby coming in close contact with the bumps and dents. Even if the sensor body 2 has a shape with bumps and dents, sufficient adhesiveness to the covering layer 3 can be secured as a matter of course and the load (pressure) acting on the outer layer 32 is surely transferred to the sensor elements 22 through the inner layer 31. In addition, bonding or assembling to couple separated components is unnecessary, whereby the workload is reduced.

Furthermore, the cast molding enables molding at a low temperature and a low pressure, in other words, a high temperature and a high pressure that the compressive molding or the injection molding produces do not occur. Thus, there is no possibility of making detection error or breakage due to the formation of the covering layer 3.

In the present embodiment, the inner layer 31 does not cover the bottom surface of the base 4. Thus, when the tactile sensor 1 is disposed to, for example, protect the bottom surface of the base 4 and support the bottom surface with a mount, the base 4 receives the load (pressure) applied from the top surface of the sensor body 2 without sinking downward, and therefore the load (pressure) acts on the sensor elements 22. Accordingly, detection can be carried out with higher accuracy. In addition, an amount of the inner layer 31 used is reduced, whereby the cost of the material is reduced, resulting in a low cost.

With regard to the specific hardness of the elastic body used in the covering layer 3, the Shore A hardness of the inner layer 31 is preferably 0 to 40 degrees, more preferably, 0 to 20 degrees. In addition, under a condition where the hardness of the outer layer 32 is higher than that of the inner layer 31, the Shore A hardness of the outer layer 31 is preferably 20 to 90 degrees, more preferably, 40 to 60 degrees. As long as the hardness of the inner layer 31 and the outer layer 32 are in those ranges, integration of the sensor body 2, the base 4, and the covering layer 3 and ensuring the detection accuracy are preferably achieved together.

The hardness of the layers 31 and 32 can be adjusted by selecting the material of an elastic body to be used or the mixing ratio of a curing agent to a main agent for molding the elastic body as appropriate.

The specific elastic body used in the covering layer 3 is selected based on, for example, the shape and properties of a detection target as appropriate, but is not limited to particular one. For example, soft rubber or resin material can be used. More specifically, examples of the elastic body include rubber, silicone, and urethane.

As long as the adhesiveness and the hardness of the inner layer 31 differ from those of the outer layer 32, the materials of the layers can be the same or different from each other. In view of capability of providing high adhesiveness between the inner layer 31 and the outer layer 32, it is preferable that the inner layer 31 and the outer layer 32 be made of the same material.

The specific thickness of the inner layer 31 and the outer layer 32 can be optimized based on, for example, the size, figure, sectional shape, quantity, and arrangement of the FPC 21 disposed under the inner layer 31, a detection target, and a detection method. In view of better detection of the load (pressure) acting on the outer layer 32 with the sensor elements 22 through the inner layer 31, however, it is preferable that the outer layer 32 be thinner than the inner layer 31.

As examples of the specific thickness, the thickness of the inner layer 31 is preferably 1.0 mm to 20.0 mm, more preferably, 2.0 mm to 10.0 mm. In addition, under a condition where the thickness of the outer layer 32 is thinner than that of the inner layer 31, the thickness of the outer layer 31 is preferably 0.2 mm to 2.0 mm, more preferably, 0.3 mm to 1.0 mm. As long as the thickness of the inner layer 31 and the outer layer 32 are in those ranges, integration of the sensor body 2, the base 4, and the covering layer 3 and ensuring the detection accuracy are preferably achieved together.

Referring to a specific example of the first embodiment, as illustrated in FIG. 1 and FIG. 2, an integrated combination in which the sensor body 2 was disposed on the base 4, the sensor body 2 including the FPC 21 on which the plurality of sensor elements 22 were disposed in line, was shaped to have the external dimensions of 20 mm in width, 30 mm in height, and 10 mm in thickness. As the covering layer 3, the inner layer 31 made of urethane having a hardness of 0 degrees with a thickness of 6 mm was integrally molded on the integrated components, and the outer layer 32 made of urethane having a hardness of 50 degrees with a thickness of 1 mm was integrally molded on the outside of the inner layer 31, whereby the tactile sensor 1 was produced.

The adhesiveness of the inner layer 31 in the covering layer 3 of the tactile sensor 1 thus produced was higher than that of the outer layer 32. The sensor body 2, the base 4, and the covering layer 3 came in close contact with each other, the inner layer 31 and the outer layer 32 came in close contact with each other, and no separation therebetween was found, accordingly, it was found that sufficient adhesiveness was secured.

A rod with a rounded tip end (R=2 mm) was pressed against the tactile sensor 1 from the surface of the covering layer 3 to the sensor elements 22. The deformation of each of the outer layer 32 and the inner layer 31 was observed and the signals output from the sensor elements 22 were detected. In addition, neither detection error nor breakage of the tactile sensor 1 thus produced was detected.

Figure 3:
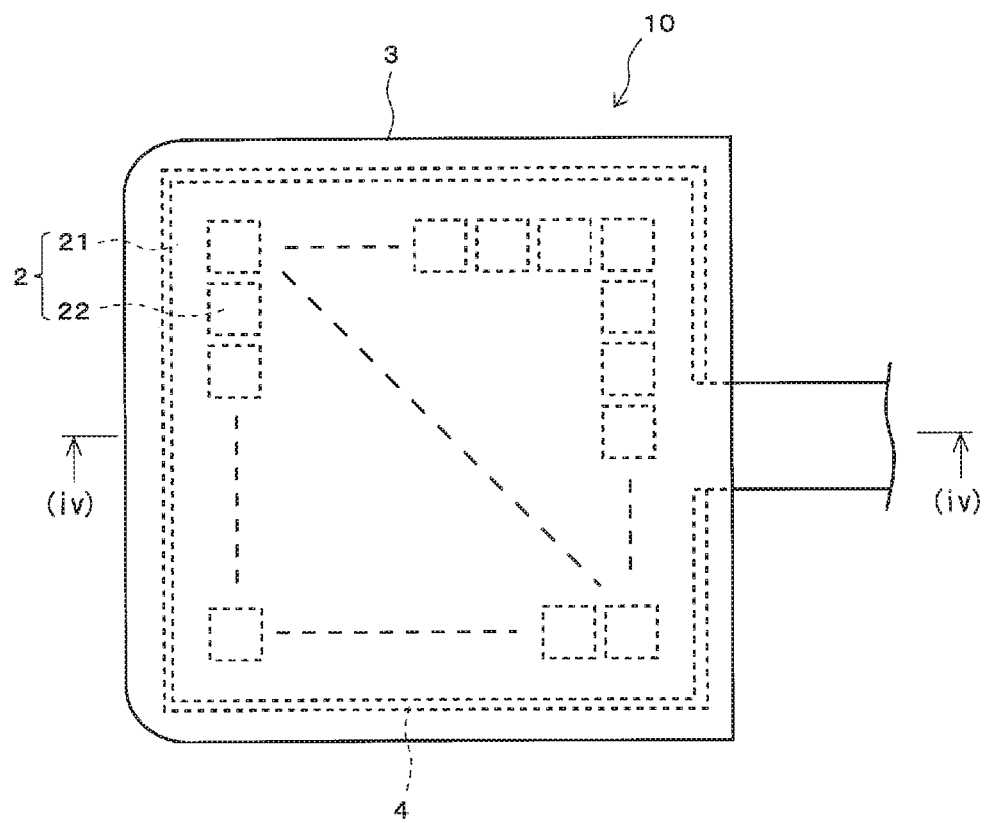
FIG. 3 is a plan view of a tactile sensor illustrating a second embodiment of the present invention.
Figure 4:
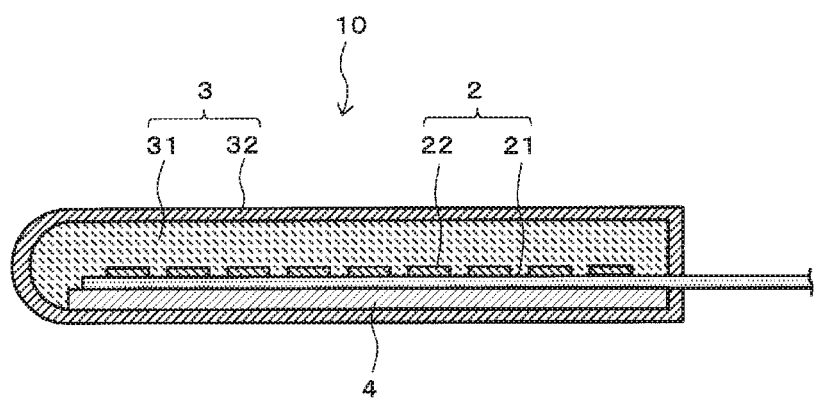
FIG. 4 is a sectional view taken along (iv)-(iv) line in FIG. 3.

FIG. 3 is a plan view of a cover structure of a tactile sensor illustrating a second embodiment of the present invention and FIG. 4 is a sectional view taken along (iv)-(iv) line in FIG. 3. The elements denoted with the same reference numerals as those in FIG. 1 and FIG. 2 have the same structures as illustrated in FIG. 1 and FIG. 2, and explanation thereof is omitted herein, citing the explanation of such elements.

The tactile sensor 10 and the tactile sensor 1 are the same in that the covering layer 3 has a two-layered structure including the inner layer 31 and the outer layer 32, but in the tactile sensor 10, the sensor body 2 disposed on the base 4 includes the FPC 21 and the plurality of sensor elements 22 arranged in a matrix on the FPC 21. This structure makes the tactile sensor 10 different from the tactile sensor 1. In the covering layer 3, the inner layer 31 is integrally molded to come in contact with the sensor body 2 over the sensor body 2 and the base 4.

With the cover structure of the tactile sensor 10 and the tactile sensor 10 can provide the same effects as those of the cover structure of the tactile sensor 1 and the tactile sensor 1. In addition, in the covering layer 10, the inner layer 31 does not cover the bottom surface of the base 4, and the outer layer 32 forming the outermost layer integrally molded to cover and wrap the outside of the inner layer 31 and the bottom surface of the base 4. Thus, similar to the tactile sensor 1, there is no possibility of separating the covering layer 3 from the base 4. The base 4 is prevented from sinking downward, accordingly, detection can be carried out with higher accuracy. In addition, an amount of the inner layer 31 used is reduced, whereby the cost of the material is reduced, resulting in a low cost.

Referring to a specific example of the first embodiment illustrated in FIG. 3 and FIG. 4, an integrated combination in which the sensor body 2 was disposed on the base 4, the sensor body 2 including the FPC 21 on which the plurality of sensor elements 22 were disposed in line, was shaped in a rectangle having the external dimensions of 100 mm Í 100 mm. As the covering layer 3, the inner layer 31 made of urethane having a hardness of 0 degrees with a thickness of 5 mm was integrally molded on the integrated components, and the outer layer 32 made of urethane having a hardness of 50 degrees with a thickness of 1 mm was integrally molded on the outside of the inner layer 31, whereby the tactile sensor 10 was produced.

The adhesiveness of the inner layer 31 was higher than that of the outer layer 32. The sensor body 2, the base 4, and the inner layer 31 of the covering layer 3 came in close contact with each other. The inner layer 31 and the outer layer 32 came in close contact with each other and no separation therebetween was found, accordingly, it was found that sufficient adhesiveness was secured.

Similar to the above embodiment, a rod with a rounded tip end (R=2 mm) was pressed against the tactile sensor 10 from the surface of the covering layer 3 to the sensor elements 22. The deformation of each of the outer layer 32 and the inner layer 31 was observed and the signals output from the sensor elements 22 were detected. In addition, neither detection error nor breakage of the tactile sensor 10 thus produced was detected.

The covering layer 3 of the above-described tactile sensor 1 or 10 has a two-layered structure including the inner layer 31 and the outer layer 32, however, one or more of other layers made of elastic body can be integrally molded between the inner layer 31 and the outer layer 32 by the casting molding unless the effect of the present invention deteriorates.

In addition, the covering layer 3 may cover at least the top surface of the sensor body 2 and there is no need to mold the covering layer 3 from the top surface of the sensor body 2 to the bottom surface of the base 4.

Furthermore, the plane shapes of the sensor body 2, the layout of the sensor elements 22, and the figure of the base 4 are not limited to the above-described aspects of the tactile sensors 1 and 10, and various plane shapes, layouts, and figures can be possible.

The cover structure of the tactile sensor and the tactile sensor of the present invention are preferably applicable to a tactile sensor in a part, for example, on a body pressure distribution sensor in a medical field and a nursing field, arms of a nursing care robot, and an authentication system based on seating pressure distribution for a seat in a vehicle, that is needed to come in contact with a human body.

EXPLANATIONS OF LETTERS OR NUMERALS 1, 10: tactile sensor
2: sensor body
21: FPC
22: sensor element
3: covering layer
31: inner layer
32: outer layer
4: base

We claim:
1. A cover structure of a tactile sensor comprising:
a sensor body; and
a covering layer made of elastic body molded on the sensor body, wherein
the covering layer includes an inner layer disposed to come in contact with the sensor body and an outer layer disposed on an outermost surface of the inner layer, the inner layer having a higher adhesiveness and a lower hardness than those of the outer layer, and the covering layer is integrally molded with the sensor body by a cast molding, wherein the sensor body is disposed on a top surface of a base, the outer layer covers at least a portion of a bottom surface of the base, the bottom surface facing away from the top surface, and the inner layer does not cover the bottom surface of the base, wherein the sensor body comprises a flexible print circuit-board and a sensor element, and wherein the flexible print circuit-board includes first and second surfaces facing opposite directions from one another, and wherein the print circuit-board is disposed such that the first surface contacts the top surface of the base and the second surface contacts the sensor element.

2. The cover structure of a tactile sensor according to claim 1, wherein the inner layer has a Shore A hardness of 0 to 40 degrees, and the outer layer has a Shore A hardness of 20 to 90 degrees.

3. The cover structure of a tactile sensor according to claim 1 wherein the inner layer has a thickness of 1.0 mm to 20.0 mm, and the outer layer has a thickness of 0.2 mm to 2.0 mm.

4. A tactile sensor comprising the cover structure of a tactile sensor according to claim 1.

\* \* \* \* \*